H. G. DAY ET AL

SMOKE DISPOSAL AND DRAFT INDUCING APPARATUS FOR LOCOMOTIVES

Jan. 5, 1932. Re. 18,316

Original Filed April 5, 1929 4 Sheets-Sheet 1

INVENTORS
HARRY G. DAY
WILLIAM E. SKINNER
By Paul, Paul & Moore
ATTORNEYS

H. G. DAY ET AL

SMOKE DISPOSAL AND DRAFT INDUCING APPARATUS FOR LOCOMOTIVES

Jan. 5, 1932. Re. 18,316

Original Filed April 5, 1929 4 Sheets-Sheet 2

INVENTORS
HARRY G. DAY
WILLIAM E. SKINNER
By Paul, Paul & Moore
ATTORNEYS

H. G. DAY ET AL

SMOKE DISPOSAL AND DRAFT INDUCING APPARATUS FOR LOCOMOTIVES

Jan. 5, 1932. Re. 18,316

Original Filed April 5, 1929 4 Sheets-Sheet 3

INVENTORS
HARRY G. DAY
WILLIAM E. SKINNER
By Paul, Paul & Moore
ATTORNEYS

H. G. DAY ET AL

SMOKE DISPOSAL AND DRAFT INDUCING APPARATUS FOR LOCOMOTIVES

Jan. 5, 1932. Re. 18,316

Original Filed April 5, 1929 4 Sheets-Sheet 4

INVENTORS
HARRY G. DAY
WILLIAM E. SKINNER
By Paul, Paul & Moore
ATTORNEYS

Reissued Jan. 5, 1932 Re. 18,316

UNITED STATES PATENT OFFICE

HARRY G. DAY AND WILLIAM E. SKINNER, OF MINNEAPOLIS, MINNESOTA

SMOKE DISPOSAL AND DRAFT INDUCING APPARATUS FOR LOCOMOTIVES

Original No. 1,768,748, dated July 1, 1930, Serial No. 352,721, filed April 5, 1929. Application for reissue filed September 30, 1931. Serial No. 566,184.

This invention relates to a smoke-disposal and draft-inducing apparatus for locomotives of the type utilized in roundhouses for conducting the products of combustion from the stacks of, and for inducing draft in the furnaces of, locomotives.

The broad object of the invention is to provide an apparatus of the character mentioned in which will be incorporated various novel and improved features and characteristics of construction designed to render the present apparatus an improvement generally over more or less similar apparatuses heretofore known.

More specific objects are to equip the up-take pipe of the apparatus with a cover adapted to be closed at all times when the apparatus is out of use and adapted to be open at all times when a locomotive smoke stack is situated in operative position relatively to the apparatus; to equip the apparatus with a valve adapted to close up the passage through the uptake pipe or conduit and open an exhaust passage leading from a locomotive fire box when the exhauster of the apparatus is caused to function, and to open up the passage through said up-take pipe or conduit and close said exhaust passage when said exhauster is not functioning; to equip the apparatus with a raising and lowering mechanism adapted to be automatically actuated to associate the up-take pipe of the apparatus with, and to remove said up-take pipe from, the smoke stack of a locomotive; to equip the apparatus with a raising and lowering mechanism adapted to be actuated by the smoke stack of a locomotive to associate the up-take pipe of the apparatus with, and to remove said up-take pipe from, said smoke stack; to provide in the apparatus an arrangement adapted to care for variations in the heights of locomotive smoke stacks, as well as variations from the vertical as may be caused, for example, by a broken spring; to provide in the apparatus an arrangement permitting a locomotive smoke stack to be in communication with the up-take pipe of said apparatus at variable location in the vicinity of the apparatus, thus making it possible to move a locomotive backwardly or forwardly within limits while being fired, or while a fire exists in the fire box, without emitting smoke or gases into a round-house; and to equip the telescoping barrels of the up-take pipe with mechanism adapted to prevent binding, as might otherwise be caused when the pull of the counterweight and the lifting movement of a locomotive smoke stack upon a telescoping barrel are unequal.

Other objects and advantages of the invention will become apparent from the full description thereof now to be made, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Figure 1:
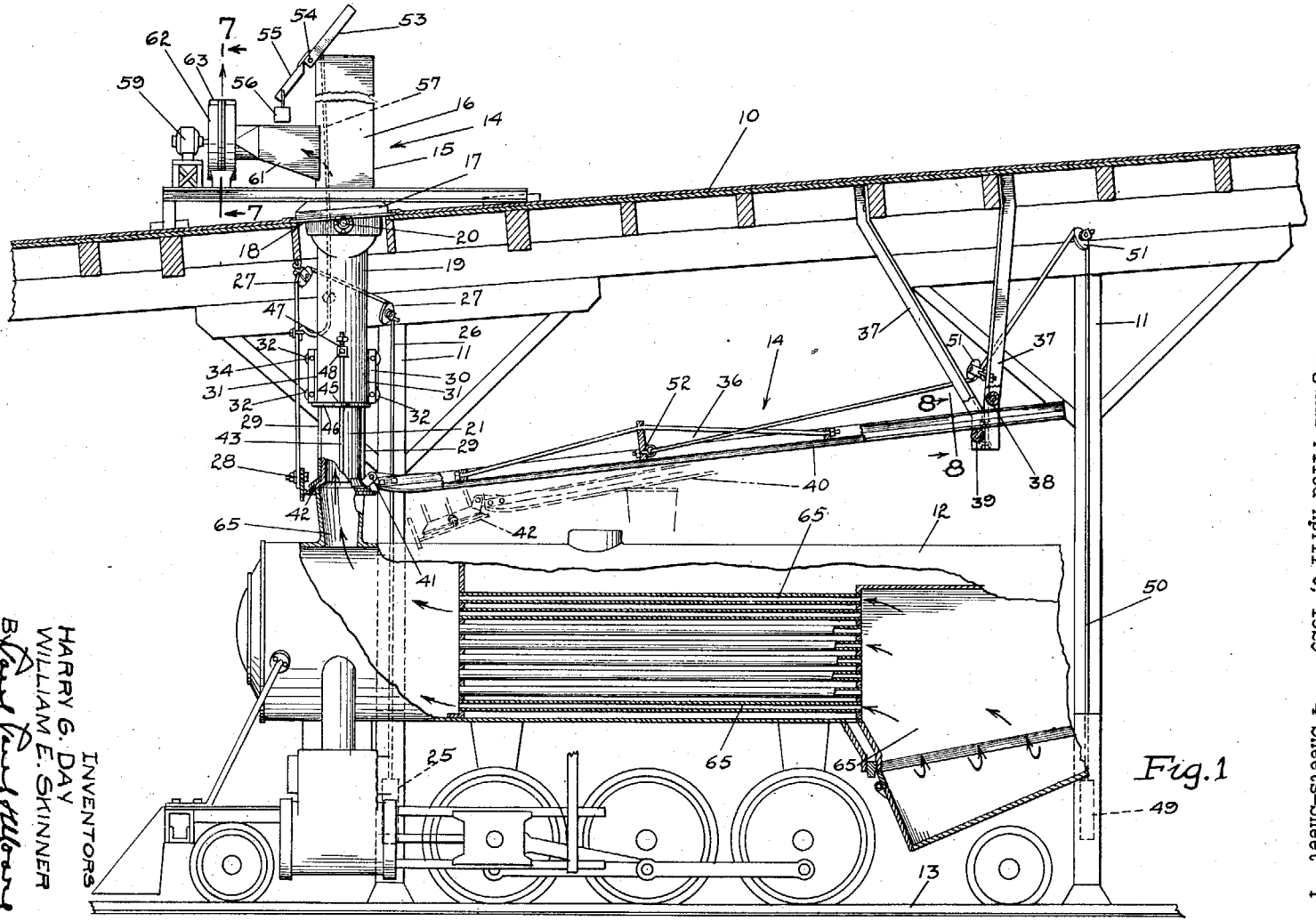
Fig. 1 is an elevational view of an apparatus in which the features of the invention are incorporated, disclosing said apparatus applied to use.

With respect to the drawings and the numerals of reference thereon, 10 designates the roof of a round-house which may have engine stalls in any desired number, 11 represents columns between the stalls, and 12 indicates a locomotive upon a track 13 and within a stall.

A separate smoke-disposal and draft-inducing apparatus, denoted generally at 14, may be provided for each stall.

An up-take pipe or conduit 15 of the apparatus 14 may consist of an upper barrel 16, suitably supported upon the round-house roof, as by a closure hood 17 surrounding said barrel 16 and an opening 18 in said roof through which the lower end portion of the barrel 16 projects, an intermediate barrel 19 having its upper end portion pivotally supported upon the lower end portion of the barrel 16, as at 20, and a lower barrel 21 having its upper end portion telescopingly received in the lower end portion of the barrel 19, as at 22.

The pivotal arrangement between the upper barrel 16 and the intermediate barrel 19 is such that the barrels 19 and 21 can swing as a unit longitudinally of the track 13, and the barrel 19 includes elongated slots 23 in its opposite walls receiving the pivot pin 20 to allow for slight sidewise swinging movement of the intermediate and lower barrels, as, for example, to accommodate the lower barrel 21 to a locomotive smoke stack which may not be exactly vertical, as will be understood. A packing 24 for the joint between the upper barrel 16 and the intermediate barrel 19 may be of any preferred design and construction.

A counterweight 25, suspended from a cord 26 which rides over fixed pulleys 27 and is attached to the barrel 21 as at 28, is for the purpose of counterbalancing the lower barrel, and the telescoping barrels are equipped with mechanism adapted to prevent binding which might otherwise be caused when the pull of the counterweight and the lifting movement of a locomotive stack upon the lower telescoping barrel are unequal. As disclosed, guide slats 29 are secured upon the outer surface of the barrel 21 in diametrically opposed relation to each other, the said guide slats extending lengthwise of said barrel 21 and preferably lying in a plane which extends substantially longitudinally of the track 13, and brackets 30, secured upon the barrel 19 as at 31, support guide rollers 32, two for each guide slat, having flanges 33, which pass through openings in the barrel 19 and engage the opposite sides of said guide slats, the said guide rollers being mounted in said brackets as denoted at 34. A packing 35 between the intermediate barrel 19 and the lower barrel 21 may be of any preferred design and construction.

A raising and lowering mechanism of the apparatus, represented generally at 36, is adapted to be actuated by the smoke stack of a locomotive to associate the up-take pipe or conduit 15 with said smoke stack and to remove said up-take pipe or conduit from the smoke stack. Of said raising and lowering mechanism, 37 designates spaced apart suspension slabs upon the round-house structure suitably supporting upper and lower, horizontal cross shafts, indicated 38 and 39, respectively, and 40 denotes a raising and lowering bar extending substantially longitudinally of the track 13, the rearward end portion of said bar 40 being freely received between said suspension slabs and said horizontal cross shafts in such manner that the bar can have upward and downward swinging movement, as well as longitudinal sliding movement, but can have very litle lateral or sidewise movement, and the forward end portion of said bar 40 being pivotally attached in any convenient manner, as at 41, to the belled, cone-shape, or funnel-shape mouth 42 of the lower barrel 21, so that the said bar 40 is normally suspended from said lower barrel.

Means for adjustably limiting downward movement of the lower barrel 21 in the intermediate barrel 19 may consist of rods 43 suitably secured to the mouth of said barrel 21, as at 44, passing upwardly through ears 45 upon a flange 46 set at the lower end of the barrel 19, and carrying nuts or collars 47 situated to engage the upper surfaces of said ears, each said nut or collar receiving a set screw 48 for locking the same at any preferred location along the length of the corresponding rod.

A counterweight 49, suspended from a cord 50 which rides over fixed pulleys 51 and is attached to the bar 40 as at 52, is for the purposes of counterbalancing said bar 40, and of normally situating said bar and the up-take pipe at about the dotted line position disclosed in Fig. 1.

A cover 53 for the upper end of the up-take pipe or conduit is adapted to be closed at all times when the apparatus is out of use and is adapted to be open at all times when a locomotive smoke stack is situated in operative position relatively to the apparatus. As disclosed, the cover 53 is pivoted upon the upper portion of the barrel 16 as at 54, and includes a protruding arm 55 carrying a weight 56 of sufficient magnitude to move said cover to open position. A cord or wire 57 attached to the cover at the side of its pivot opposite the weight is also attached to the end portion of the cord 26 which is adjacent the barrel 21 the arrangement being such that when the said barrel 21 is moved to its lowermost position by its own weight and the weight of the bar 40, the cord or wire 57 is drawn downwardly to move the cover to closed position against the action of the weight 56, but when the barrel 21 is elevated, said weight acts to open the cover. Means may be provided for closing the cover even when a smoke stack is associated with the up-take conduit.

An exhauster for the up-take pipe 15 may consist of a usual or preferred type of fan 58 actuated by a suitable motor 59, both shown situated upon the round-house roof. As disclosed, the upper barrel 16 has an opening 60 receiving one end of a box 61 the opposite end of which communicates with the interior of the fan housing 62. Numeral 63 represents the fan housing outlet.

Figure 2:
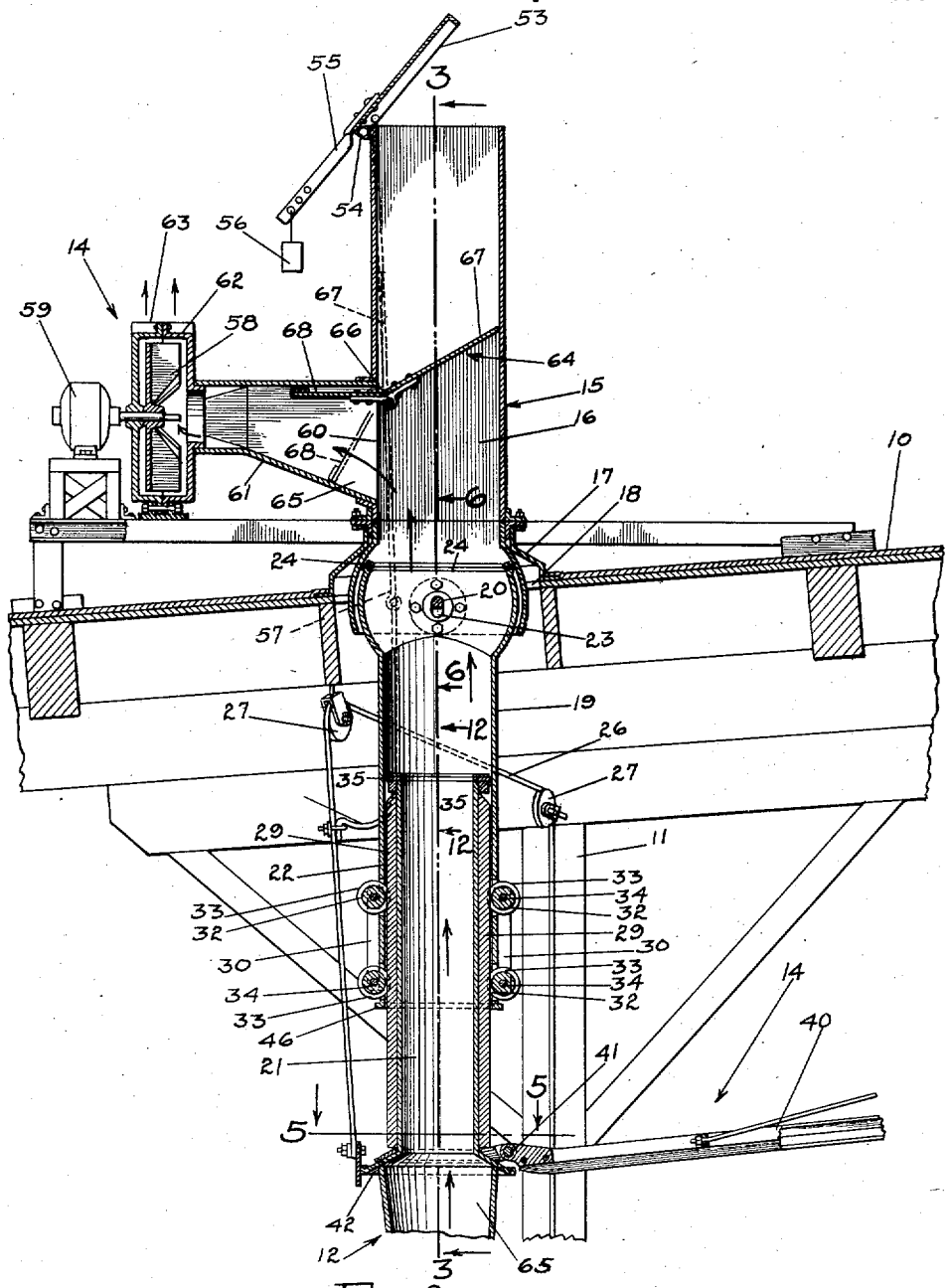
Fig. 2 is an enlarged vertical sectional view of the up-take pipe and exhauster of the apparatus taken substantially on line 2—2 in Fig. 3.
Figure 3:
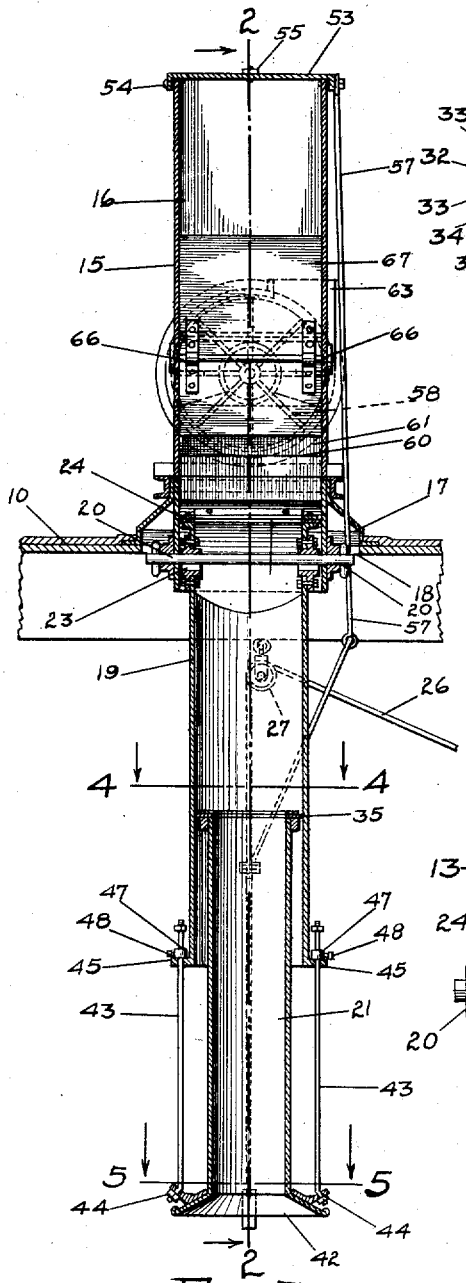
Fig. 3 is a vertical sectional view, taken substantially on line 3—3 in Fig. 2.
Figure 4:
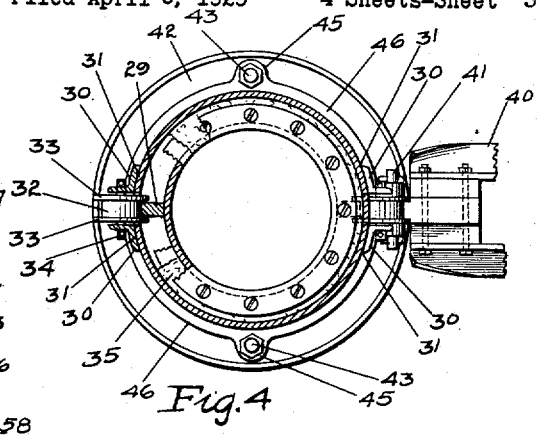
Fig. 4 is an enlarged horizontal sectional view, taken substantially on line 4—4 in Fig. 3.
Figure 5:
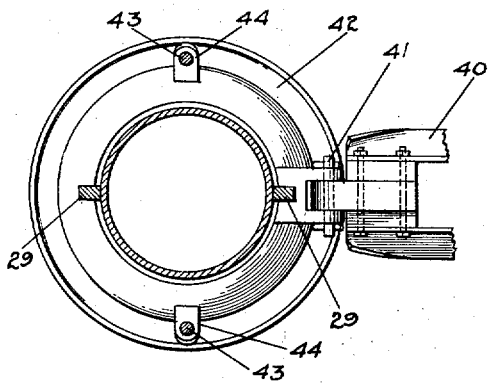
Fig. 5 is an enlarged horizontal sectional view, taken substantially on line 5—5 in Fig. 2 or Fig. 3.
Figure 6:
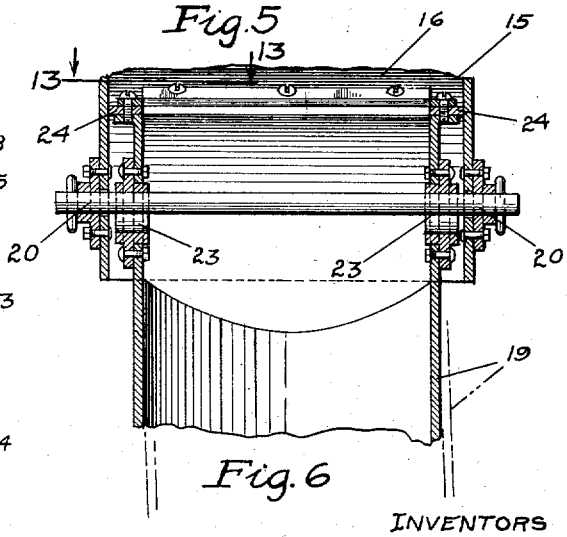
Fig. 6 is a detail sectional view, taken substantially on line 6—6 in Fig. 2.
Figure 7:
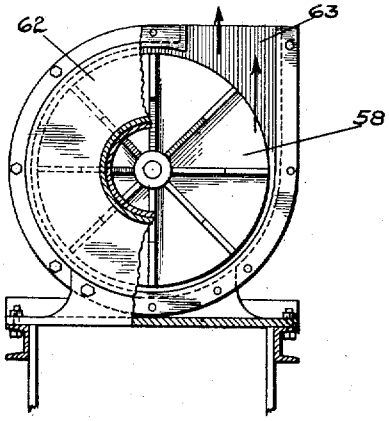
Fig. 7 is an enlarged sectional view, taken substantially on line 7—7 in Fig. 1, detailing the exhauster.
Figure 8:
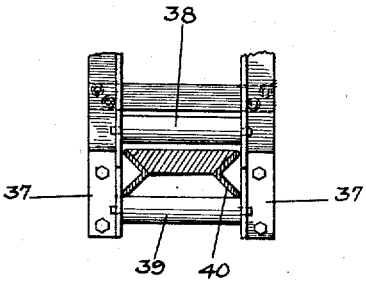
Fig. 8 is an enlarged sectional view, taken substantially on line 8—8 in Fig. 1, detailing features of the raising and lowering mechanism for actuating the up-take pipe.
Figure 9:
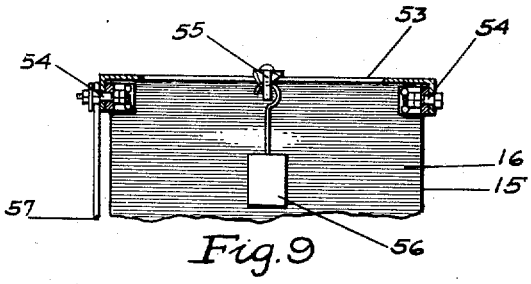
Fig. 9 is a view detailing features of the up-take pipe cover.
Figure 10:
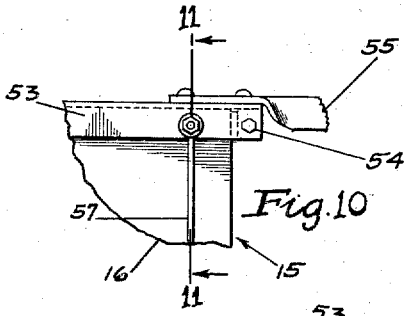
Fig. 10 is a view detailing other features of said up-take pipe cover.
Figure 11:
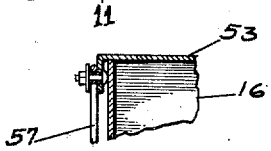
Fig. 11 is a detail sectional view, taken substantially on line 11—11 in Fig. 10.
Figure 12:
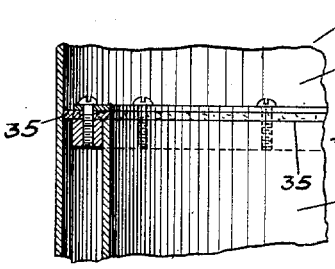
Fig. 12 is a detail sectional view, taken substantially on line 12—12 in Fig. 2.
Figure 13:
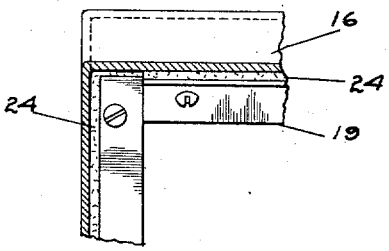
Fig. 13 is a detail sectional view, taken substantially on line 13—13 in Fig. 6.

A valve 64 is for the purpose of closing up the passage through the up-take pipe or conduit and of opening an exhaust passage 65, leading from a locomotive fire box and through the exhauster, when the motor 59 is operated to actuate said exhauster, the said valve 64 being adapted to open up the passage through said up-take pipe or conduit and to close said exhaust passage when said exhauster is not functioning. As disclosed, the valve 64 is pivoted in the barrel 16 at a location intermediate the ends of said valve, as indicated at 66, and includes an arm 67 for closing the passage through the barrel 16 and an arm 68 for closing passage through the box 61, one of said arms being in open position while the other arm is in closed position. The arm 68 is constructed to be heavier than the arm 67, so that normally the passage through the box 61 is closed and passage through the barrel 16 is open. The arrangement is such, however, that when the fan 58 is operated, suction created in the box 61 is sufficient to draw the arm 68 to about the position as disclosed in Fig. 2, to thus open the passage through said box and close passage through the barrel 16, as will be obvious.

Supposing the bar 40 to be in normal position, say, for example, as disclosed in dotted lines in Fig. 1, and it is desired to associate a locomotive smoke stack with the mouth 42 of the up-take pipe or conduit 15, all that is necessary to be done to accomplish this result is to move the locomotive from the dotted line position of the smoke stack in said Fig. 1 toward the full line position of the locomotive disclosed, until said smoke stack has caused the bar 40, together with the lower barrel 21, to be elevated, and has entered the mouth of said lower barrel. The arrangement is such that the smoke stack will snugly fit into the mouth of the lower barrel when at any one of several different positions to provide a smoke-tight association between said stack and the up-take pipe or conduit, as will be understood. After the smoke stack has associated itself with the mouth of the up-take pipe or conduit, movement of said smoke stack still farther ahead will obviously cause the barrel 21 and the bar 40 to be still farther elevated and said bar 40 to be slid longitudinally ahead. Upon return movement of the locomotive, the smoke stack will not be removed from the up-take pipe or conduit until the rearward position at which the smoke stack entered the barrel 21 has been passed, so that a locomotive can be moved forwardly and backwardly within limits while associated with the up-take pipe of the apparatus without permitting smoke or gases to be emitted into a round-house.

The utilization of raising and lowering mechanism actuated by the smoke stack of a locomotive to associate the up-take pipe with, and to disassociate said up-take pipe from, said smoke stack, eliminates all labor and maintenance which have heretofore been required to accomplish the association and disassociation of stacks with apparatuses of the present character, and the arrangement as disclosed obviously makes provision for variations in the heights of locomotive smoke stacks, as well as for variations from the vertical as may be caused by broken springs.

As will be evident, whenever the bar 40 and the barrel 21 are elevated by a smoke stack, the cover 53 will be in open position, and when said bar and barrel are allowed to lower, said cover will be closed.

We claim as our invention:

1. In an apparatus of the character described, an up-take conduit comprising a plurality of pipes arranged to have movement relatively to each other, including a pipe adapted to be associated with the smoke stack of a locomotive and a second pipe with which said pipe communicates to carry products of combustion away from said smoke stack, a cover for the upper end of said second pipe, mounted exteriorly of said pipe, means normally maintaining said cover in closed position, and means actuated by relative movement between said pipes for actuating said cover to open position.

2. In an apparatus of the character described, an up-take conduit comprising a plurality of pipes arranged to have movement relatively to each other, including a lower pipe adapted to be associated with the smoke stack of a locomotive and an upper pipe with which said lower pipe communicates to carry products of combustion away from said smoke stack, a cover for the upper end of said upper pipe mounted exteriorly of said pipe, means connecting said cover with said lower pipe for normally maintaining the cover in closed position, and means for maintaining said cover in open position when said lower pipe is associated with a locomotive smoke stack.

3. In an apparatus of the character described, an up-take conduit comprising a plurality of pipes arranged to have movement relatively to each other, including a lower pipe adapted to be associated with the smoke stack of a locomotive and an upper pipe with which said lower pipe communicates to carry products of combustion away from said smoke stack, a portion of said lower pipe being normally situated below the elevation of the upper portion of said smoke stack, a cover for said upper pipe, means connecting said cover with said lower pipe for normally maintaining the cover in closed position, and means for maintaining said cover in open position when said lower pipe is elevated to be associated with a locomotive smoke stack.

4. In an apparatus of the character described, an up-take conduit comprising a plurality of pipes, including an upper pipe, an intermediate pipe pivoted upon said upper pipe, and a lower pipe adapted to be associated with the smoke stack of a locomotive, said lower pipe being arranged in telescopic relation to said intermediate pipe and having a portion normally situated below the elevation of the upper portion of said smoke stack, a cover for said upper pipe, means connecting said cover with said lower pipe for normally maintaining the cover in closed position, and means for maintaining said cover in open position when said lower pipe is elevated to be associated with a locomotive smoke stack.

5. In an apparatus of the character described, an up-take conduit comprising a plurality of pipes arranged to have movement relatively to each other; including a lower pipe adapted to be associated with the smoke stack of a locomotive and an upper pipe with which said lower pipe communicates to carry products of combustion away from said smoke stack, a portion of said lower pipe being normally situated below the elevation of the upper portion of said smoke stack, means limiting downward movement of said lower pipe, a member connected to said lower pipe and adapted to be elevated by said smoke stack to situate the mouth of said lower pipe at position to be entered by the smoke stack, a cover for said upper pipe, means connecting said cover with said lower pipe for normally maintaining the cover in closed position, and means for maintaining said cover in open position when the smoke stack elevates said member.

6. In an apparatus of the character described, an up-take conduit comprising a plurality of pipes, including an upper pipe, an intermediate pipe pivoted upon said upper pipe, and a lower pipe adapted to be associated with the smoke stack of a locomotive, said lower pipe being arranged in sliding telescopic relation to said intermediate pipe and having a portion normally situated below the elevation of the upper portion of said smoke stack, means limiting downward movement of said lower pipe, a member connected to said lower pipe and adapted to be elevated by said smoke stack to situate the mouth of said lower pipe at position to be entered by the smoke stack, a cover for said upper pipe means connecting said cover with said lower pipe for normally maintaining said cover in closed position, and means for maintaining said cover in open position when the smoke stack elevates said member.

7. In an apparatus of the character described, an up-take conduit comprising a plurality of pipes arranged to have movement relatively to each other, including a lower pipe adapted to be associated with the smoke stack of a locomotive and an upper pipe with which said lower pipe communicates to carry products of combustion away from said smoke stack, a portion of said lower pipe being normally situated below the elevation of the upper portion of said smoke stack, means limiting downward movement of said lower pipe, and a member mounted for swinging and longitudinal movement and connected to said lower pipe and adapted to be elevated by said smoke stack to situate the mouth of said lower pipe at position to be entered by the smoke stack.

8. In an apparatus of the character described, an up-take conduit comprising a plurality of pipes arranged to have movement relatively to each other, including a lower pipe adapted to be associated with the smoke stack of a locomotive and an upper pipe with which said lower pipe communicates to carry products of combustion away from said smoke stack, a portion of said lower pipe being normally situated below the elevation of the upper portion of said smoke stack, means limiting downward movement of said lower pipe, and a member connected to said lower pipe, said member being mounted to slide in the direction of movement of the smoke stack and being adapted to be elevated by said smoke stack to situate the mouth of said lower pipe at position to be entered by the smoke stack.

9. In an apparatus of the character described, an up-take conduit comprising a plurality of pipes, including an upper pipe, an intermediate pipe pivotally supported upon said upper pipe, and a lower pipe adapted to be associated with the smoke stack of a locomotive, said lower pipe being arranged in sliding telescopic relation to said intermediate pipe and having a portion normally situated below the elevation of the upper portion of said smoke stack, means limiting downward movement of said lower pipe, and a member connected to said lower pipe and adapted to be elevated by said smoke stack to situate the mouth of said lower pipe at position to be entered by the smoke stack.

10. In an apparatus of the character described, an up-take conduit comprising a plurality of pipes including an upper pipe, an intermediate pipe pivotally supported upon said upper pipe, and a lower pipe adapted to be associated with the smoke stack of a locomotive, said lower pipe being arranged in sliding telescopic relation to said intermediate pipe and having a portion normally situated below the elevation of the upper portion of said smoke stack, means limiting downward movement of said lower pipe, and a member connected to said lower pipe, said member being mounted to slide in the direction of movement of the smoke stack and being adapted to be elevated by said smoke stack to situate the mouth of said lower pipe at position to be entered by the smoke stack.

11. In an apparatus of the character described, an up-take conduit comprising a plurality of pipes, including an upper pipe, an intermediate pipe pivotally supported upon said upper pipe, and a lower pipe adapted to be associated with the smoke stack of a locomotive, said intermediate pipe being mounted to swing in the general direction of the length of said locomotive, and said lower pipe being arranged in sliding telescopic relation to said intermediate pipe and having a portion normally situated below the elevation of the upper portion of said smoke stack, means limiting downward movement of said lower pipe, and a member connected to said lower pipe, said member being mounted to slide in the direction of movement of the smoke stack and being adapted to be elevated by said smoke stack as the same advances toward said lower pipe, whereby to associate the lower portion of the up-take conduit with a locomotive smoke stack.

12. In an apparatus of the character described, an up-take conduit mounted above rails adapted to cary a locomotive, said up-take conduit including a lower pipe mounted to swing longitudinally of said rails and to be capable of having a raising and a lowering movement, means limiting downward movement of said lower pipe, and a member attached to said lower pipe and adapted to be engaged and elevated by a smoke stack of an advancing locomotive to situate the mouth of said lower pipe at position to be entered by the smoke stack.

13. In an apparatus of the character described, an up-take conduit mounted above rails adapted to carry a locomotive, said up-take conduit including a lower pipe mounted to swing longitudinally of said rails and to be capable of having a raising and a lowering movement, means limiting downward movement of said lower pipe, and a member attached to said lower pipe mounted to have upward and downward swinging movement and movement longitudinally of said rails, said member being arranged to be engaged and elevated by a smoke stack of an advancing locomotive to situate the mouth of said lower pipe at position to be entered by the smoke stack, and said lower pipe and said member being adapted to have upward and downward swinging movement and movement in the direction of travel of the smoke stack while said smoke stack is associated with said lower pipe.

14. In an apparatus of the character described, an up-take conduit mounted above rails adapted to carry a locomotive, said up-take conduit including a lower pipe mounted to swing longitudinally of said rails and to be capable of having a raising and a lowering movement, means limiting downward movement of said lower pipe, and a member pivotally attached to said lower pipe mounted to have upward and downward swinging movement and movement longitudinally of said rails, said member being arranged to be engaged and elevated by a smoke stack of an advancing locomotive to situate the mouth of said lower pipe at position to be entered by the smoke stack, said smoke stack being adapted to snugly fit said lower pipe while at any one of several different positions, and said lower pipe and said member being adapted to have upward and downward swinging movement and movement in the direction of travel of the smoke stack while said smoke stack is associated with said lower pipe.

15. In an apparatus of the character described, an up-take conduit mounted above rails adapted to carry a locomotive, said up-take conduit including a lower pipe mounted to swing longitudinally of said rails and to be capable of having a raising and a lowering movement, means limiting downward movement of said lower pipe, a member attached to said lower pipe mounted to have upward and downward swinging movement and movement longitudinally of said rails, and means for normally disposing said member and said lower pipe in oblique relation to a smoke stack of a locomotive when upon said rails, said member being arranged to be engaged and elevated by a smoke stack of an advancing locomotive to situate the mouth of said lower pipe at position to be entered by the smoke stack, and said lower pipe and said member being adapted to have upward and downward swinging movement and movement in the direction of travel of the smoke stack while said smoke stack is associated with said lower pipe.

16. In an apparatus of the character described, an up-take conduit mounted above rails adapted to carry a locomotive, said up-take conduit including a lower pipe mounted to swing longitudinally of said rails and to be capable of having a raising, a lowering, and a slight sidewise movement, means limiting downward movement of said lower pipe, and a member attached to said lower pipe and adapted to be engaged and elevated by a smoke stack of an advancing locomotive to situate the mouth of said lower pipe at position to be entered by the smoke stack.

17. In an apparatus of the character described, an up-take conduit adapted to lead from a locomotive fire box, an exhauster with which said up-take conduit is adapted to communicate, and a valve mounted adjacent the location of communication between said up-take conduit and said exhauster including an arm adapted to shut off communication between said up-take conduit and said exhauster and an arm adapted to shut off passage through said up-take conduit, the said valve being adapted to shut off passage through the up-take conduit and to open an exhaust passage leading from said locomotive fire box when said exhauster is operating, and to open passage through said up-take conduit and close said exhaust passage when the operation of said exhauster is stopped.

18. In an apparatus of the character described, a pair of telescoping pipes, opposed guide slats extending longitudinally of one of said telescoping pipes, and rollers mounted upon the other telescoping pipe and associated with said guide slats.

19. In an apparatus of the character described, an up-take conduit including a movable lower pipe adapted to be associated with the smoke stack of a locomotive, means adapted to be actuated responsively to the approach of a locomotive to situate the mouth of said lower pipe at position to be entered by said smoke stack, a cover for said up-take conduit, means for normally maintaining said cover in closed position, and means for maintaining said cover in open position when the mouth of said lower pipe is in position to be entered by said smoke stack.

20. In an apparatus of the character described, an up-take conduit comprising a plurality of pipes arranged to have movement relatively to each other, including a lower pipe adapted to be associated with the smoke stack of a locomotive and an upper pipe with which said lower pipe communicates to carry products of combustion away from said smoke stack, means adapted to be actuated responsively to the approach of a locomotive to situate the mouth of said lower pipe at position to be entered by said smoke stack, a cover for said upper pipe, means connecting said cover with said lower pipe for normally maintaining the cover in closed position, and means for maintaining said cover in open position when the mouth of said lower pipe is in position to be entered by said smoke stack.

21. In an apparatus of the character described, an up-take conduit mounted above rails adapted to carry a locomotive, said up-take conduit including a lower pipe mounted to swing longitudinally of said rails and to be capable of having a raising and a lowering movement, means limiting downward movement of said lower pipe, and means responsive to the approach of a locomotive to situate the mouth of said lower pipe at position to be entered by the smoke stack of said locomotive.

22. In an apparatus of the character described, an up-take conduit mounted above rails adapted to carry a locomotive, said up-take conduit including a lower pipe mounted to swing longitudinally of said rails and to be capable of having a raising and a lowering movement, and means attached to said lower pipe and responsive to the approach of a locomotive to situate the mouth of said lower pipe at position to be entered by the smoke stack of said locomotive, said lower pipe being adapted to have upward and downward swinging movement and movement in the direction of travel of said smoke stack while said smoke stack is associated with said lower pipe.

23. In an apparatus of the character described, an uptake conduit mounted above rails adapted to carry a locomotive, said up-take conduit including a lower pipe mounted to swing longitudinally of said rails and to be capable of having a raising, a lowering, and a slight sidewise movement, and means adapted to be actuated responsively to the approach of a locomotive to situate the mouth of said lower pipe at position to be entered by the smoke stack of said locomotive.

24. In an apparatus of the character described, an up-take conduit including a swingable and vertically movable lower pipe adapted to be associated with the smoke stack of a locomotive, and means adapted to be actuated responsively to the approach of a locomotive for assembling the mouth of said lower pipe and said smoke stack with each other.

25. In an apparatus of the character described, an up-take conduit including a swingable and vertically movable lower pipe adapted to be associated with the smoke stack of a locomotive, and means adapted to be actuated responsively to the approach of a locomotive for causing said smoke stack to enter the mouth of said lower pipe.

26. In an apparatus of the character described, an up-take conduit including a movable lower member adapted to be associated with the smoke stack of a locomotive, and means adapted to be actuated responsively to the approach of a locomotive for positively assembling said lower member and said smoke stack with each other, said smoke stack being adapted to be automatically disassembled from said lower member whenever said locomotive departs from the general vicinity of said lower member.

27. In an apparatus of the character described, an up-take conduit including a movable lower pipe adapted to be associated with the smoke stack of a locomotive, and means adapted to be actuated responsively to the approach of a locomotive for causing said smoke stack to positively enter the mouth of said lower pipe to thus cause the smoke stack and lower pipe to be positively assembled, said smoke stack and lower pipe being adapted to become automatically disassembled upon the departure of said locomotive away from said up-take conduit.

28. In an apparatus of the character described, an up-take conduit mounted above rails adapted to carry a locomotive, said up-take conduit including a lower pipe mounted to swing longitudinally of said rails and to be capable of having a raising and a lowering movement, and means responsive to the approach of a locomotive to situate the mouth of said lower pipe at position to be entered by the smoke stack of said locomotive.

29. In an apparatus of the character described, an up-take conduit including a lower pipe adapted to be associated with the smoke stack of a locomotive, said lower pipe being mounted to swing relatively to a smoke stack and to be capable of having a raising and a lowering movement, and means responsive to the approach of a locomotive to situate the mouth of said lower pipe at position to be entered by the smoke stack of said locomotive.

HARRY G. DAY.
WILLIAM E. SKINNER.